(12) United States Patent
Kiani

(10) Patent No.: US 6,619,854 B2
(45) Date of Patent: Sep. 16, 2003

(54) TECHNIQUES FOR CLEANING AN OPTICAL INTERFACE OF AN OPTICAL CONNECTION SYSTEM

(75) Inventor: Sepehr Kiani, Watertown, MA (US)

(73) Assignee: Teradyne, Inc., Boston, MA (US)

( * ) Notice: Subject to any disclaimer, the term of this patent is extended or adjusted under 35 U.S.C. 154(b) by 164 days.

(21) Appl. No.: 09/773,347

(22) Filed: Jan. 31, 2001

(65) Prior Publication Data

US 2002/0102065 A1 Aug. 1, 2002

(51) Int. Cl.[7] .................................................. G02B 6/38

(52) U.S. Cl. ....................................................... 385/75

(58) Field of Search ............................. 385/75, 92, 88, 385/94, 93, 129, 76, 72, 70, 71, 53, 55, 56, 59, 60

(56) References Cited

U.S. PATENT DOCUMENTS

| | | | |
|---|---|---|---|
| 4,088,386 A | * | 5/1978 | Hawk ....................... 350/96.21 |
| 4,436,366 A | | 3/1984 | Abramson |
| 4,456,351 A | | 6/1984 | Hiramatsu et al. .......... 354/402 |
| 4,469,398 A | * | 9/1984 | De Baets et al. .......... 350/96.2 |
| 5,144,611 A | | 9/1992 | Engler et al. .................. 369/71 |
| 5,220,703 A | | 6/1993 | Kanayama et al. ......... 15/210.1 |
| 5,337,396 A | * | 8/1994 | Chen et al. .................... 385/92 |
| 5,598,495 A | * | 1/1997 | Rittle et al. .................... 385/75 |
| 5,725,154 A | | 3/1998 | Jackson ....................... 239/135 |
| 5,768,738 A | | 6/1998 | Lee ............................. 15/210.1 |
| 6,300,082 B1 | * | 10/2001 | Erb et al. ..................... 385/129 |

FOREIGN PATENT DOCUMENTS

EP 1 048 963 A1 11/2000 ............ G02B/6/38

OTHER PUBLICATIONS

European Patent Office; Patent Abstracts of Japan; Publication No.: 2002031739; Publication Date: Jan. 31, 2002; Application No.: 2000215365; Applicant: NTT Advanced Technology Corp.; 1 Page.
3M Utilities and Telecommunications: VOL–0570 VF–45™ Maintenance Cleaning Kit; http://products.3m.com/us/util_telecom/products/tsdvolition.jhtml?powurl= GSN8925771gs; Visited Site on Apr. 24, 2002; 2 Pages.
http://multimedia.mmm.com/mws/ mediawebserver.dyn?666666Ozjcf6Ivs6Evs666tQ3c7rr; Visited Site on Apr. 24, 2002; 1 Page of Picture.
New York Institute of Photography; Tips for Better Phtotgraphs; NYI Camera Corner: Spring Cleaning–Camera Cleaning!; http://www.nyip.com/sub_idx_pgs/referidx/ camera_corner_0599.html; 4 pages.

* cited by examiner

Primary Examiner—Jean F. Duverne
(74) Attorney, Agent, or Firm—Chapin & Huang, L.L.C.; David E. Huang, Esq.

(57) ABSTRACT

The invention is directed to techniques for cleaning an optical interface pneumatically, i.e., using fluid (liquid or gas). Fluid can be delivered in an automated manner at a particular time (e.g., connection time) in order alleviate the burden of a technician having to manually clean the optical interface with conventional cleaning material or a stick-on adhesive each time the technician exposes the optical interface. One arrangement is directed to an optical connection system having a first optical connector and a second optical connector. The first optical connector includes a first optical connector housing and a first optical interface fastened to the first optical connector housing. The second optical connector includes a second optical connector housing and a second optical interface fastened to the second optical connector housing. The second optical connector housing defines an aperture that directs fluid over at least one of the first and second optical interfaces.

27 Claims, 9 Drawing Sheets

TECHNIQUES FOR CLEANING AN OPTICAL INTERFACE OF AN OPTICAL CONNECTION SYSTEM

BACKGROUND OF THE INVENTION

A typical fiber optic connection between a first fiber optic component and a second fiber optic component (e.g., between two fiber optic cables, between a fiber optic cable and a fiber optic module, etc.) is formed by aligning an optical interface of the first fiber optic component (e.g., an end of a fiber optic cable) with an optical interface of the second fiber optic component (e.g., an end of another fiber optic cable or a fiber optic module).

Clean optical interfaces tend to form fiber optic connections with less light distortion and less light energy loss than dirty optical interfaces. Additionally, dirt and dust tend to build up on the optical interfaces of optical components over time. Accordingly, fiber optic component manufactures and fiber optic component users (e.g., technicians) typically take steps to clean the optical interfaces of their fiber optic components. For example, fiber optic cable manufacturers typically specify that the interfaces be cleaned between mates, and typically polish the optical interfaces of fiber optic cable assemblies (a portion of fiber optic cable with a fiber optic connector terminating each end) prior to releasing the fiber optic cable assemblies into the stream of commerce.

Nevertheless, once a fiber optic component is removed from its packaging and handled, it becomes susceptible to dust and dirt. Over time, the accumulation of dust and dirt can become significant, e.g., after unplugging and plugging-in a fiber optic connector of a fiber optic cable assembly multiple times. In extreme situations, the amount of light energy loss can become so great that light detection circuitry at the end of the fiber optic pathway is no longer able to detect the light signal. To avoid such situations, some technicians clean the optical interfaces of fiber optic cable assemblies prior to each use, i.e., prior to connecting the assemblies with other fiber optic components. For example, some technicians wipe the optical interfaces with cleaning material (e.g., cleaning fabric, cleaning paper, or solvents) that tends to remove dirt and dust from the optical interfaces without depositing additional dirt and dust. Other technicians apply a stick-on adhesive to the optical interfaces and then remove the stick-on adhesive in order to remove the dirt and dust.

As another example, in one conventional configuration, a daughter card includes multiple optical interfaces which mate with a circuit board. A technician cleans the optical interfaces of the daughter card at the same time by applying and removing a special cleaning card having sticky cleaning surfaces that correspond to the optical interfaces.

As yet another example, and for conventional configuration having multiple connectors with optical interfaces that connect to optical interfaces of corresponding connectors, a technician cleans the optical interfaces with an aerosol spray. That is, the technician sprays one optical interface in order to clean that interface, then sprays another optical interface in order to clean that other optical interface, and so on.

SUMMARY OF THE INVENTION

Unfortunately, there are deficiencies to the above-described conventional approaches to cleaning optical interfaces of fiber optic components. For example, in the conventional approach that involves a technician wiping an optical interface with cleaning material (e.g., fabric or paper), the technician may need to clean several optical interfaces in a short period of time (e.g., to disconnect and reconnect several fiber optic components). To this end, the technician may attempt to reuse the same cleaning material which becomes more contaminated after every use. Eventually, the cleaning material may actually introduce dirt and dust onto the optical interfaces. Such dirt and dust could be visually undetectable but nevertheless degrade performance of the fiber optic component (e.g., distort the fiber optic signal, reduce the effective length of the fiber optic pathway, etc.).

Additionally, in the conventional approach that involves a technician applying an aerosol spray individually to optical interfaces to remove dust and dirt, the spray tends to blow the dust and dirt into the air (e.g., everywhere in an uncontrolled manner). That is, as the technician cleans one optical interface with the aerosol spray, the dust and dirt blown off that optical interface tends to settle on and contaminate other optical interfaces (e.g., exposed and recently cleaned neighboring optical interfaces).

Furthermore, some fiber optic components are disposed in locations which are difficult for a technician to access. For example, fiber optic modules could be mounted to a backplane within a card cage. Such modules could be easily accessible by a circuit board having corresponding fiber optic modules mounted thereon, but difficult to reach by the technician. Accordingly, having a technician manually clean the optical interfaces of such hard-to-reach components, e.g., (i) manually wipe the hard-to-reach optical interfaces with cleaning material or (ii) manually apply and remove a stick-on adhesive, is extremely burdensome.

Also, in the conventional approach that uses a special cleaning card having sticky cleaning surfaces for cleaning multiple optical interfaces of a daughter card that mates with a circuit board, the technician still manually cleans the circuit board that mates with the daughter card (e.g., one optical interface at a time). Accordingly, there is still a high risk of contaminating the optical interfaces of the circuit board, particularly if the technician uses the same cleaning material (e.g., the same cleaning cloth). Furthermore, recently cleaned neighboring optical interfaces which are exposed while other optical interfaces are being cleaned run the risk of collecting dirt and dust since it takes very little time for particles to settle on the optical interfaces.

In contrast to the above-described conventional approaches to cleaning optical interfaces of fiber optic components, the invention is directed to techniques for cleaning an optical interface using a pressurized fluid (e.g., an inert gas or liquid solvent). The fluid can be delivered in an automated manner at a particular time (e.g., during connection of two optical connectors) in order alleviate the burden of a technician having to manually clean each optical interface with conventional cleaning material or a conventional stick-on adhesive each time the technician handles (e.g., disconnects and reconnects) a fiber optic component.

One arrangement is directed to an optical connection system having a first optical connector and a second optical connector. The first optical connector includes a first optical connector housing and a first optical interface fastened to the first optical connector housing. The second optical connector includes a second optical connector housing and a second optical interface fastened to the second optical connector housing. The second optical connector housing defines an aperture that directs fluid (e.g., a gas) over at least one of the first and second optical interfaces. Any contaminating dust and dirt can be blown away thus providing clean optical interfaces for forming fiber optic connections.

In one arrangement, the second optical connector housing further defines a chamber, and the first optical connector housing defines a piston that engages the chamber defined by the second optical connector housing to force fluid within the chamber through the aperture defined by the second optical connector housing. This piston and chamber arrangement provides a simple and convenient mechanism for pressurizing and directing the fluid (e.g., air).

In one arrangement, the second optical connector further includes an elastomer seal (e.g., an O-ring) disposed around an opening of the chamber through which the piston passes when engaging the chamber. The use of the elastomer seal prevents the fluid from leaking out of the chamber through any gaps between the sides of the chamber and the piston by removing such gaps.

In one arrangement, the optical connection system further includes a container (e.g., a replaceable cartridge or canister) that stores compressed fluid. The container includes a trigger that actuates to release the compressed fluid through the aperture defined by the second optical connector housing. The use of the container enables the use of fluids other than air (e.g., complex mixtures). In one arrangement, the compressed fluid is substantially nitrogen which is relatively harmless and inert. In another arrangement, the fluid is a mixture of compressed gas (a propellant) and liquid (e.g., a solvent).

In one arrangement, the first optical connector housing defines a cavity configured to hold at least a portion of the container. Accordingly, a technician can simply remove and replace the container when the container is almost empty such as after a set number of uses (e.g., 20 insertions).

In one arrangement, the optical connection system further comprises a filter that traps impurities. Preferably, the filter is disposed within the aperture defined by the second optical connector housing of the second optical connector. In one arrangement, the filter is a sub-micron filter for filtering out even extremely small particles.

The features of the invention, as described above, may be employed in fiber optic systems, devices and methods and other computer-related components such as those of Teradyne, Incorporated of Boston, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The invention is directed to techniques for cleaning an optical interface of a fiber optic component using fluid (i.e., a gas, a liquid, or a gas/liquid mixture). Fluid is preferably delivered in an automated manner at a particular time (e.g., during connection of two fiber optic components) in order alleviate the burden of a technician having to manually clean the optical interface using conventional approaches such as wiping the optical interface with cleaning material or applying a stick-on adhesive each time the technician exposes the optical interface. Any contaminating dust and dirt can be blown away in a controlled manner thus providing a clean optical interface for forming a fiber optic connection.

Figure 1A:
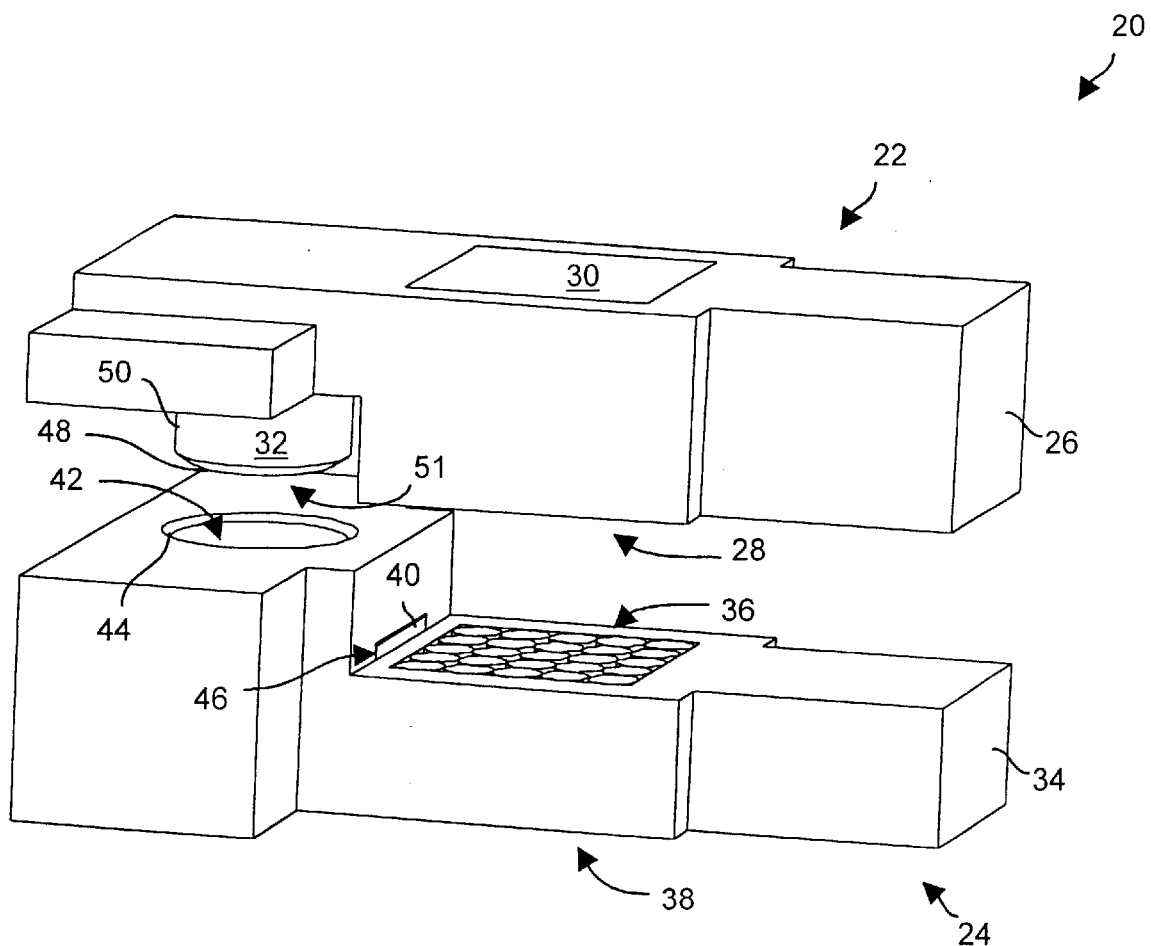
FIG. 1A is a perspective view of an optical connection system which is suitable for use by the invention.

FIG. 1A shows a fiber optic connection system 20 which is suitable for use by the invention. The fiber optic connection system 20 includes an optical connector 22 and another optical connector 24. The optical connector 22 includes an optical connector housing 26 and an optical interface 28 (shown only by the arrow 28 in FIG. 1A). The optical connector housing 26 defines a cavity 30 and a piston 32. The cavity 30 is an opening through which optical cable portions can extend when the connector 22 terminates an end of an optical cable assembly.

As further shown in FIG. 1A, the optical connector 24 includes an optical connector housing 34 and an optical interface 36 (similar to the optical interface 28 of the optical connector 22). The optical connector housing 34 defines a cavity 38 (shown only by the arrow 28 but similar to the cavity 30 defined by the optical connector housing 26 shown in FIG. 1A). The optical connector housing 34 further defines an aperture 40 and a chamber 42. The aperture 40 extends from a periphery of the optical interface 36 to the chamber 42 through the optical connector housing 34. The optical connector 24 further includes an elastomer seal 44 (e.g., a rubber O-ring) that lines the opening of the chamber 42, and a filter 46 that resides in the aperture 40.

The piston 32 of the optical connector 22 includes an end 48 which is configured to engage with the chamber 42 of the of the optical connector 24. In particular, a side 50 of the piston 32 preferably makes contact with the elastomer seal 44 to form a fluid tight seal to prevent fluid (e.g., gas) from escaping between the seal 44 and the side 50. The end 48 of the piston 32 preferably includes a check valve 51 (shown only by the arrow 51 in FIG. 1A), the operation of which will be discussed in detail later.

It should be understood that the optical connectors 22, 24 further include connecting structures that align and fasten the optical connectors 22, 24 together. Examples of such connecting structures include conventional connector guides, alignment posts, support tabs, or the like, and are omitted from FIG. 1A for simplicity. When the optical connectors 22, 24 are properly aligned and fastened together the optical interfaces 28, 36 are flush against each other to form one or more optical connections. In one arrangement, each optical interface 28, 36 includes an end of a portion of fiber optic cable such that one optical connection is formed. In another arrangement, each optical interface 28, 36 includes an array of ends of a set of fiber optic cable portions such that multiple optical connections are formed. Each fiber optic cable portion end for the optical interface 28 is preferably fastened to the optical connector housing 26 within the cavity 30 (e.g., secured within a ferrule that is epoxied to the optical connector housing 26). Similarly, each fiber optic cable portion end for the optical interface 36 is preferably fastened to the optical connector housing 34 within the cavity 38. It should be understood that the lengths of the fiber optic cable portions can be longer than the heights of the optical connector housings 26, 34 for cable assemblies, and can be shorter than the heights of the optical connector housings 26, 34 for fiber optic modules.

By way of example only, each optical interface 28, 36 in FIG. 1A is a 5×5 array of fiber ends. Accordingly, when the connectors 22, 24 properly connect with each other, the optical interfaces 28, 36 form 25 optical connections.

It should be understood that the piston 32 defined by the optical connector housing 26 is configured to engage the chamber 42 defined by the optical connector housing 34 when the optical connectors 22, 24 are brought together. In this situation, fluid (e.g., air) within the chamber 42 is compressed and forced through the aperture 40. As the fluid escapes through the aperture 40, the filter 46 removes large particles which could contaminate the optical interfaces 28, 36 if allowed to blow onto the optical interfaces 28, 36. The aperture 40 directs the filtered fluid over the optical interfaces 28, 36 in order to remove any dust or dirt. Accordingly, the optical interfaces 28, 36 are routinely and consistently cleaned pneumatically each time the optical connectors 22, 24 connect with each other. The burden of the user having to remember to clean the optical interfaces 28, 36 is removed. Additionally, the burden of the user having to reach difficult-to-access places when the connectors 22, 24 are in non-user-friendly locations is avoided. Furthermore, the user does not need to worry about storing and disposing of conventional cleaning products.

It should be further understood that the elastomer seal 44 reduces likelihood that fluid will escape between the sides of the piston 32 and the chamber 42 when the connectors 22, 24 are connecting. Rather, more fluid is retained in the chamber 42 and forced through the aperture 40 so that the aperture 40 can direct that fluid over the optical interfaces 22, 24 to clean them.

Figure 1B:
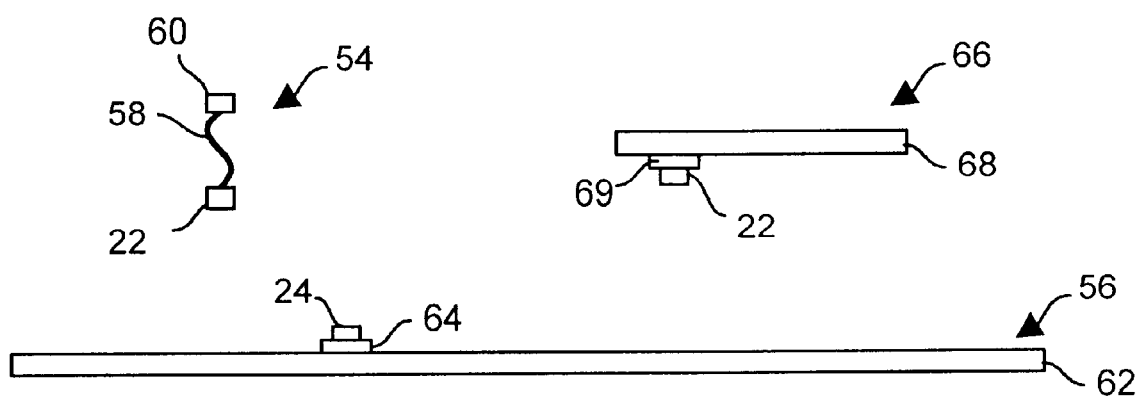
FIG. 1B is a perspective view of the optical connection system of FIG. 1A when, by way of example only, the system is incorporated into particular fiber optic components.

FIG. 1B shows, by way of example only, some fiber optic components which utilize the optical connection system 20 of FIG. 1A. In particular, FIG. 1B shows a fiber optic cable assembly 54 that connects to a circuit board 56 using the fiber optic connectors 22, 24 of FIG. 1A. The fiber optic cable assembly 54 includes a portion of fiber optic cable 58, an optical connector 60 (e.g., either the optical connector 22 or the optical connector 24) and the optical connector 22 of the fiber optic connection system 20. The circuit board 56 includes a section of circuit board material 62, a fiber optic module 64 (e.g., a transceiver that converts electrical signals into optical signals and vice versa), and the optical connector 24 of the fiber optic connection system 20. The fiber optic cable assembly 54 connects to the circuit board 56 when a user plugs the optical connector 22 of the fiber optic cable assembly 54 into the optical connector 24 of the circuit board 56. As this occurs, the piston 32 of the optical connector 22 engages the chamber 42 of the optical connector 24 to force fluid through the aperture 40 in order to clean the optical interfaces 28, 36 in an automated manner, e.g., without the user having to manually wipe the optical interfaces 28, 36 with conventional cleaning material or apply a conventional stick-on adhesive. Accordingly, a user does not need to worry about manually accessing optical interfaces in hard-to-reach locations (e.g., manually wiping optical interfaces in poorly accessible card cages).

As another example, FIG. 1B further shows another circuit board 66 which includes a section of circuit board material 68, a fiber optic module 69 and the optical connector 22 of the connection system 20. The circuit boards 56, 66 connect with each other when a user connects the two optical connectors 22, 24 together (e.g., within a card cage). As this occurs, compressed fluid blows over the optical interfaces 28, 36 to clean them.

It should be understood that the optical connector 22 of the circuit board 66 (e.g., a daughter card) and the optical connector 24 of the circuit board 24 of the circuit board 56 were illustrated in the above example as module-type fiber optic connectors (i.e., connectors that attach directly to an operating component). In other arrangements, either (or both) of the optical connectors 22, 24 is a pass through-type connector that connects directly to a fiber optic cable portion (e.g., the circuit board 56 can be a fiber optic backplane, and the connector 24 can connect to a fiber optic cable portion embedded within the backplane). Further details of the connection system 20 will now be provided with reference to FIGS. 2A through 2D.

Figure 2A:
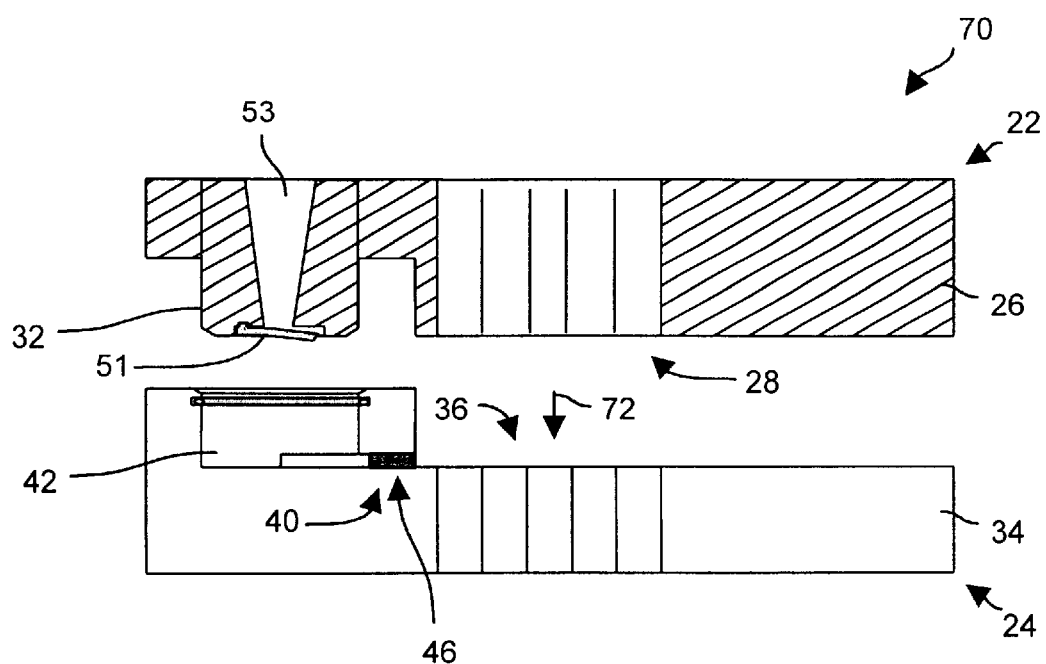
FIG. 2A is a cross-sectional view of the optical connection system of FIG. 1A when a first optical connector and a second optical connector of the optical connection system are disconnected.

FIG. 2A shows a cross-sectional view 70 of the optical connectors 22, 24 when they are disconnected from each other. This is a preferred orientation of the optical connectors 22, 24 just prior to a user connecting the optical connectors 22, 24 together. In this orientation, the piston 32 of the optical connector 22 is aligned with the chamber 42 of the optical connector 24. Additionally, the optical interface 28 of the optical connector 22 is aligned with the optical interface 36 of the optical connector 24. To connect the optical connectors 22, 24 together, the user moves the optical connectors 22, 24 toward each other, e.g. moves the optical connector 22 in the direction of the arrow 72.

Figure 2B:
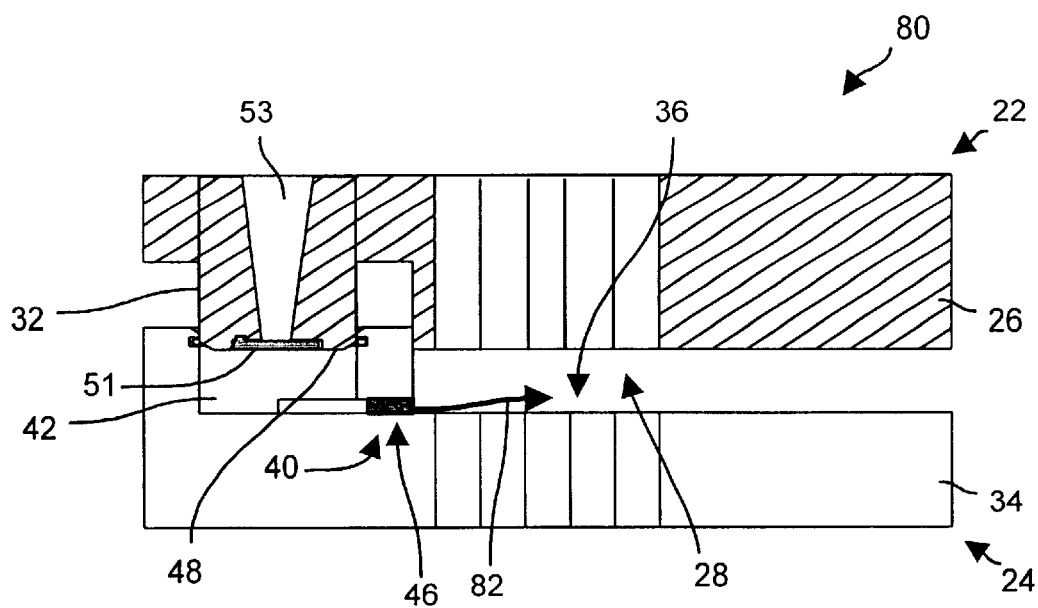
FIG. 2B is a cross-sectional view of the first optical connector and the second optical connector of FIG. 2A when the first and second optical connectors are in contact with each other.

FIG. 2B shows a cross-sectional view 80 of the optical connectors 22, 24 when the user brings the optical connectors 22, 24 in contact with each other. In particular, the edge around the end 48 of the piston 32 contacts the elastomer seal 44 which is disposed around the opening of the chamber 42 (see FIG. 1A). Such contact reduces the likelihood of fluid escaping from the chamber 42 through that opening of the chamber 42 as the piston 32 further engages the chamber 42. Rather, fluid within the chamber 42 is compressed and forced through the aperture 40 defined by the optical connector housing 34, and over the optical interfaces 28, 36. During this process, the check valve 51 closes due to positive pressure within the chamber 42 (e.g., the check valve flap seals due to the piston 32 thrusting forward into the chamber 42). Accordingly, the check valve 51 prevents gas from escaping through a fluid path 53 in the piston 32. Rather, the fluid passes through the aperture 40, and the filter 46 removes any impurities from the fluid so that such impurities do not contaminate the optical interfaces 28, 36. The aperture 40 directs the filtered fluid over the optical interfaces 28, 36 in the direction of arrow 82.

Figure 2C:
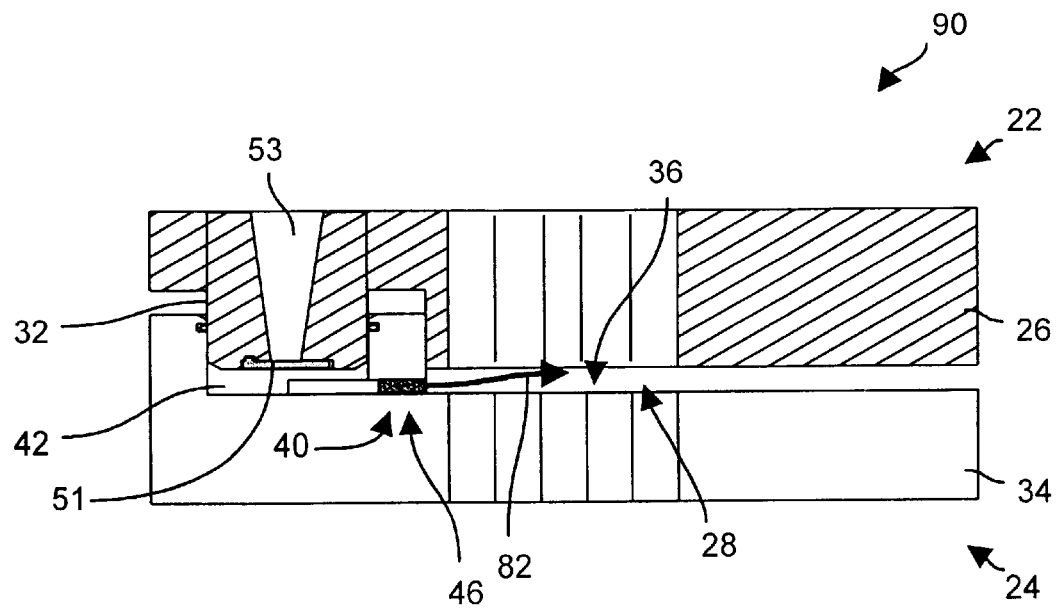
FIG. 2C is a cross-sectional view of the first optical connector and the second optical connector of FIG. 2B when a piston of the first optical connector partially engages a chamber of the second optical connector.

FIG. 2C is a cross-sectional view 90 of the optical connectors 22, 24 with the piston 32 of the optical connector 22 partially engaging the chamber 42 of the optical connector 24. This situation exists when the user is in the process of connecting the optical connectors 22, 24 together. As shown in FIG. 2C, the aperture 40 continues to direct fluid over the optical interfaces 28, 36 in the direction of arrow 82 in order to clean them. It should be understood that the fluid is directed (e.g., focused) to blow dust and dirt from one side of the optical interfaces 28, 36 to the other and away from both of the optical interfaces 28, 36. Accordingly, dust and dirt is not scattered everywhere in an uncontrolled manner such as in the conventional approach of spraying an aerosol spray over an optical interface which blows dust and dirt into the air which can then settle back over the optical interface or other exposed and recently cleaned neighboring optical interfaces.

Figure 2D:
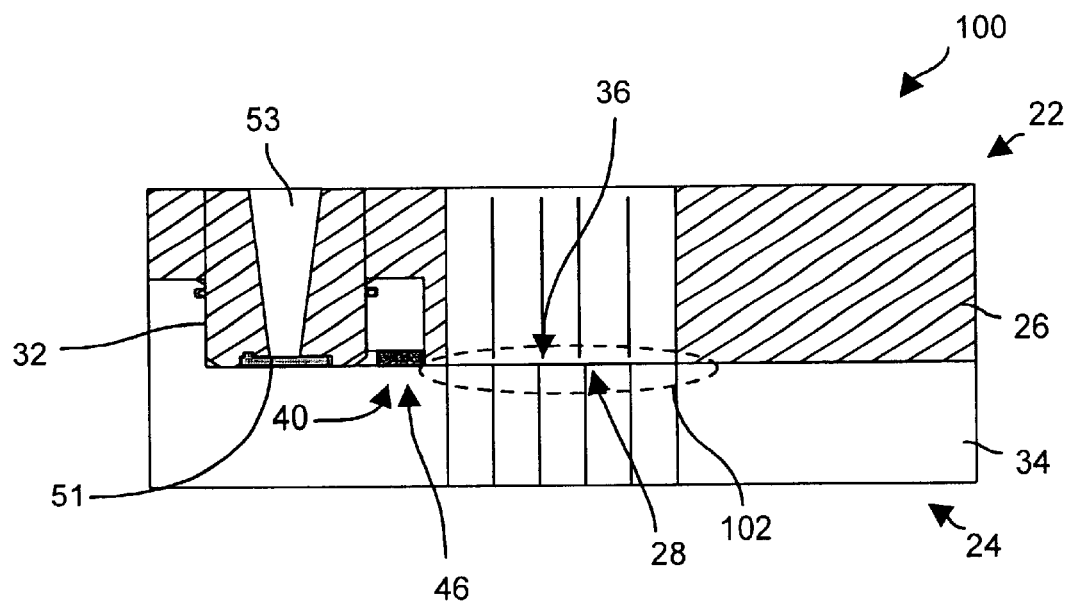
FIG. 2D is a cross-sectional view of the first optical connector and the second optical connector of FIG. 2C when the piston of the first optical connector completely engages the chamber of the second optical connector.

FIG. 2D is a cross-sectional view 100 of the optical connectors 22, 24 when the user completes connection of the optical connectors 22, 24. As shown, the piston 32 completely engages the chamber 42. Furthermore, the optical interfaces 28, 36 of the optical connectors 22, 24 are now flush against each other in order to form a set of optical connections 102. Since the aperture 40 defined by the optical connector housing 34 directs fluid over the optical interfaces 28, 36 just prior to forming this set of optical connections 102, the set of optical connections 102 are clean and reliable. Removal of dust and dirt from the optical interfaces 28, 36 improves light transmission through the set of connections 102. Since the optical connections 102 are formed right after cleaning of the optical interfaces 28, 36 there is little or no opportunity for dust or dirt to settle over and contaminate the optical interfaces 28, 36 prior to optical connection formation.

It should be understood that the optical connectors 22, 24 can be disconnected at a later time. During disconnection, the check valve 51 opens to allow fluid to enter the chamber 42 through the fluid pathway 53 (also see FIGS. 2B and 2A). In particular, the check valve 51 opens when the relative pressure is zero or negative within the chamber 42 (e.g., during connector disengagement) to avoid drawing air through the aperture 40 and drawing particles onto the optical interfaces 28, 36. Further details of how a user forms the set of connections 102 of the fiber optic connection system 20 will now be provided with reference to FIG. 3.

Figure 3:
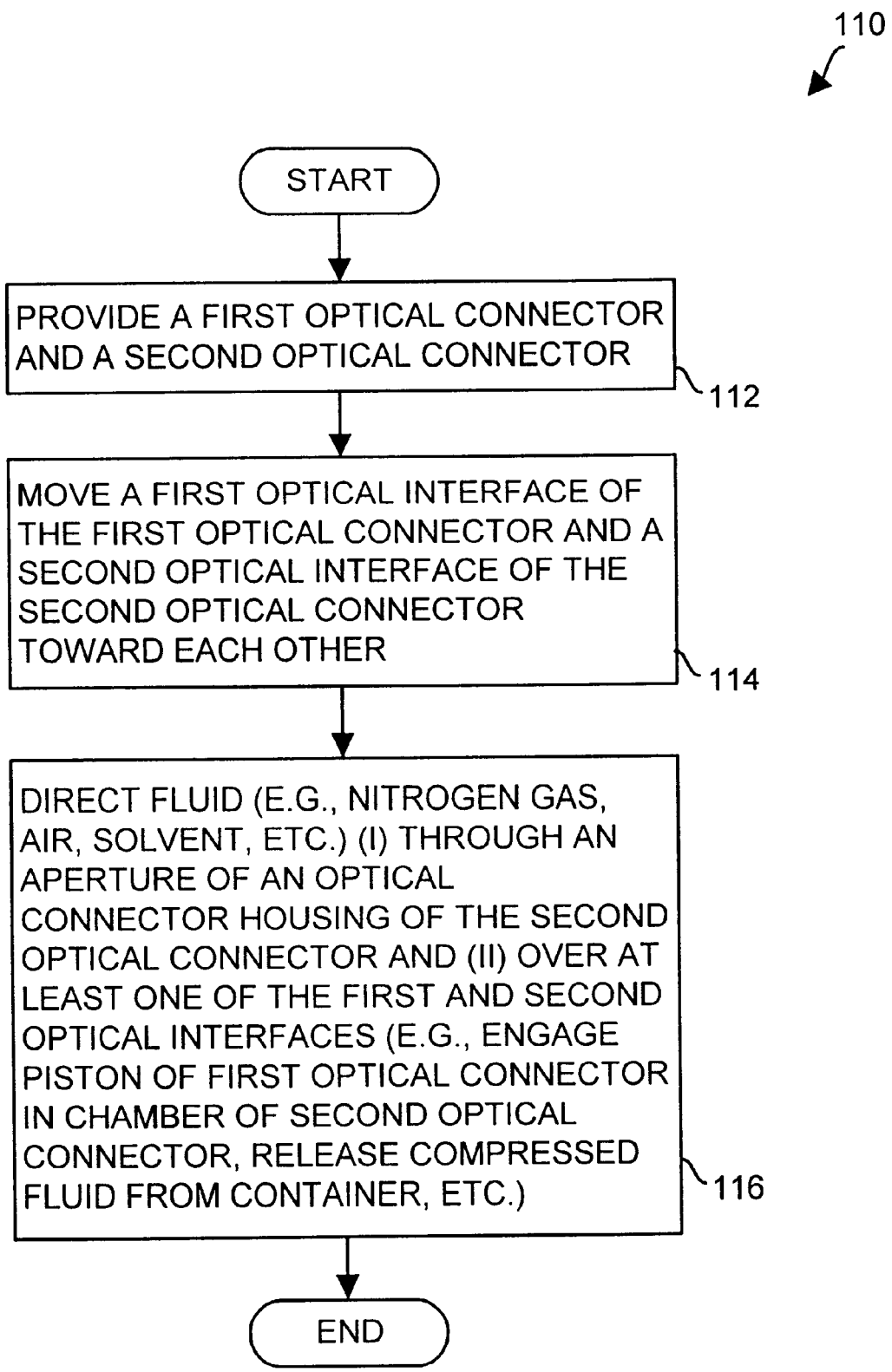
FIG. 3 is a flowchart of a procedure performed by a user of the connection system of FIG. 1A.

FIG. 3 shows a procedure 110 which is performed by a user of the connection system 20 to form the set of connections 102 of FIG. 2D. In step 112, the user provides the optical connectors 22, 24. Preferably, the optical connectors 22, 24 are oriented as shown in FIG. 2A.

In step 114, the user moves the optical interface 28 of the optical connector 22 and the optical interface 36 of the optical connector 24 toward each other. For example, the user can move the optical connector 22 in the direction of the arrow 72 (see FIG. 2A) so that the optical interface 28 and the optical interface 36 move toward each other.

In step 116, the user directs fluid (i) through the aperture 40 of the optical connector 24 (defined by the optical connector housing 34) and (ii) over the optical interfaces 28, 36. This occurs when the user moves the optical connectors 22, 24 toward each other as shown in FIGS. 2B, 2C and 2D. That is, as the user brings the two optical connectors 22, 24 together, the piston 32 of the optical connector 22 engages the chamber 42 of the optical connector 24 thus closing the check valve 51 and compressing fluid within the chamber 42. As a result, the fluid is forced through the aperture 40, and is directed from the aperture 40 and over the optical interfaces 28, 36 to remove dust and dirt.

It should be understood that the user does not need to worry about directly cleaning the optical interfaces 28, 36 (e.g., manually wiping the optical interfaces 28, 36). Rather, cleaning of the optical interfaces 28, 36 occurs automatically when the user connects the two optical connectors 22, 24.

Figure 4:
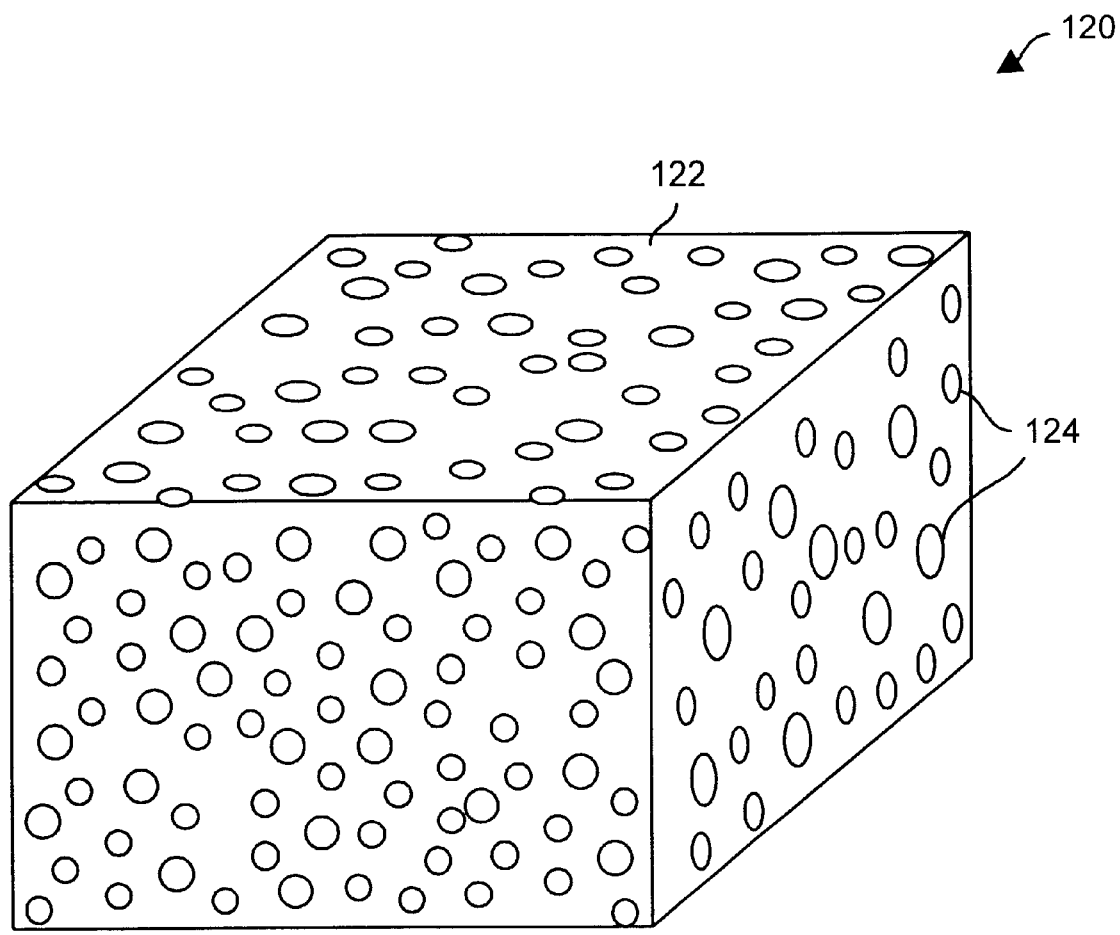
FIG. 4 is a perspective view of filter material which is suitable for use by the connection system of FIG. 1A.

It should be further understood that, during step 116, the filter 46 residing within the aperture 40 removes impurities from the fluid so that those impurities (e.g., particles) do not contaminate the optical interfaces 28, 36. FIG. 4 shows a portion of filtering material 120 which is suitable for use as the filter 46. The filtering material 120 includes a permeable substance 122 (e.g. metal, glass, ceramic material, etc.) having a network of channels and holes 124 passing therethrough. Preferably, the channels and holes 124 have very tiny diameters so that the portion of filtering material 120 captures contaminants larger than a micron, i.e., so that the filtering material 120 is essentially a sub-micron filter. In one arrangement, the filtering material 120 captures particles as small as 0.25 microns. Further details of the connection system 20 will now be provided with reference to FIG. 5.

Figure 5:
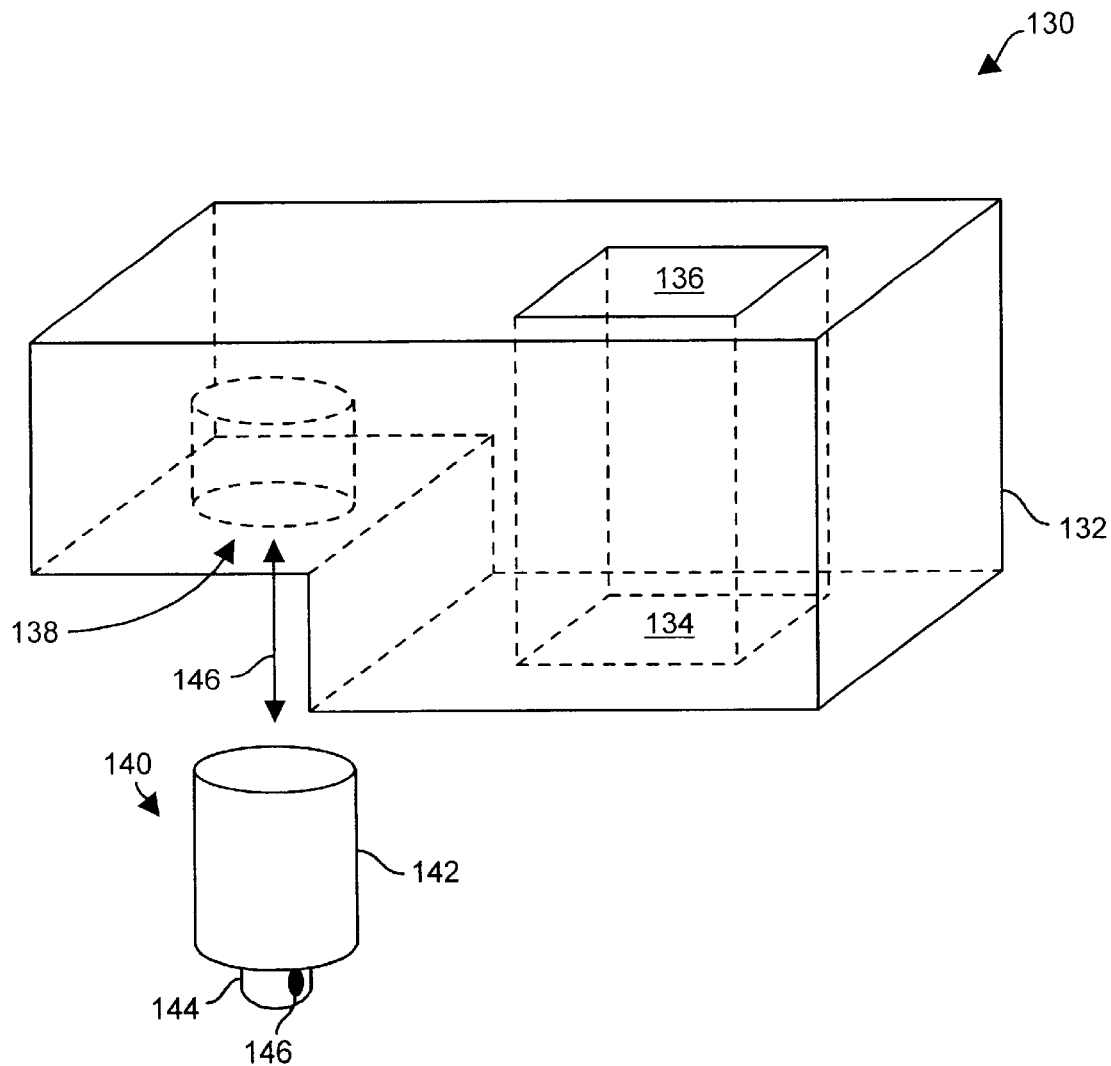
FIG. 5 is a perspective view of an alternative optical connector which is suitable for use by the optical connection system of FIG. 1A.

FIG. 5 shows an optical connector 130 which is suitable for use in the fiber optic connection system 20 of FIG. 1A. In particular, the optical connector 130 is a suitable alternative to the optical connector 22 of FIG. 1A. The optical connector 130 includes an optical connector housing 132 and an optical interface 134 (one or more fiber optic cable ends) which is fastened to the optical connector housing 132 within a cavity 136 defined by the optical connector housing 132. The optical connector housing 132 further defines a cavity 138 which is configured to hold a container 140 of compressed fluid (e.g. nitrogen). The container 140 includes a container body 142 and a trigger 144. By way of example only, the trigger 144 includes a nozzle 146 for releasing the compressed fluid. When the user brings the connector 130 holding the container 140 into contact with the corresponding connector 24 (i.e., when the trigger 144 is moved toward the container body 142, the trigger 140 actuates to release the compressed fluid (e.g., pressurized gas, pressurized gas propelled solvent, etc.).

Preferably, the container 140 is insertable into and removable from the cavity 138 by a user. For example, the user can initially insert a first container 140 which is fully charged with compressed nitrogen gas. The user can then operate (i.e., disconnect and connect) the fiber optic connection system 20 (see FIG. 1A) a set number of times (e.g. 20 times). In particular, each time the user disconnects and reconnects the connectors 130, 24, some of the compressed nitrogen gas exits from the container 140 through the aperture 40 of the connector 24 to clean the optical interfaces 134, 36. Over time, the pressure within the container 140 diminishes. After the user disconnects and reconnects the connectors 130, 24 the set number of times, the user simply removes the first container 140 from the cavity 138, and replaces that first container 140 with a new container 140 which is fully charged with compressed nitrogen gas. Accordingly, subsequent disconnections and reconnections occur with substantial fluid pressure. The first container 140 can be recycled (e.g. recharged with more compressed nitrogen gas) in order to save resources.

Figure 6:
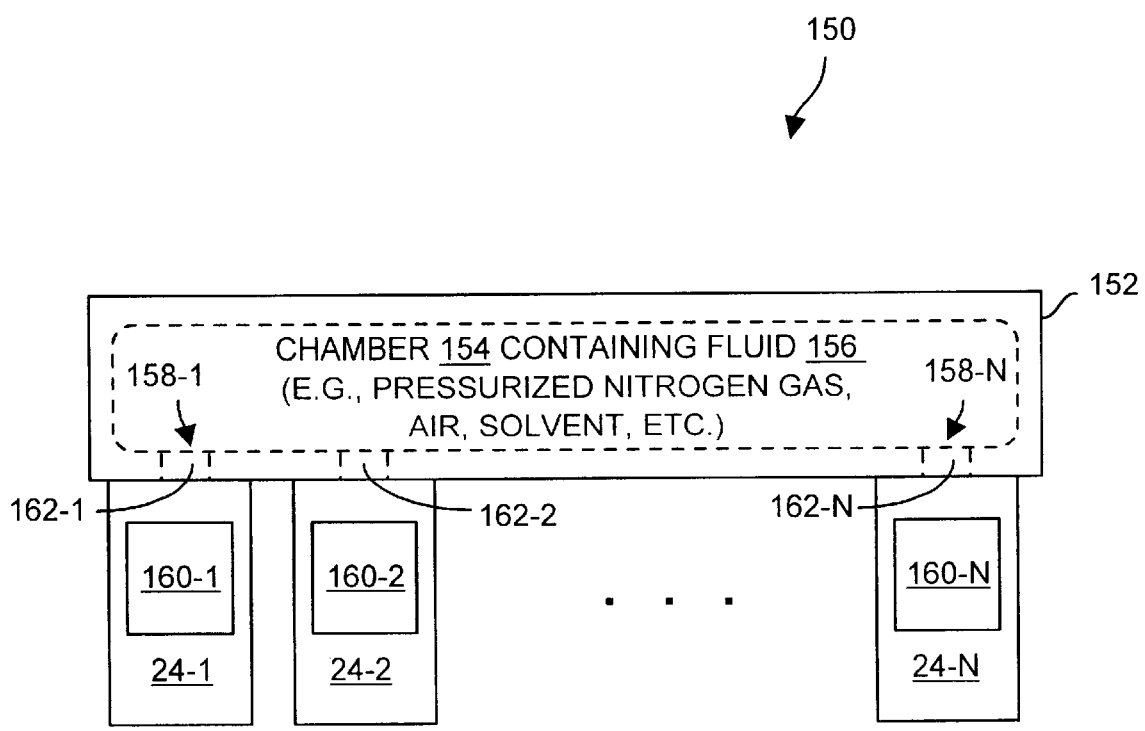
FIG. 6 is a block diagram of an optical connector assembly which is suitable for use by the optical connection system of FIG. 1A.

FIG. 6 shows a connector assembly 150 which is suitable for use by the fiber optic connection system 20 of FIG. 1A. The connector assembly 150 includes a centralized compressed fluid source 152 and multiple connector housings 24-1, . . . 24-N coupled to the compressed fluid source 152. The compressed fluid source 152 is essentially a manifold that defines a chamber 154 containing compressed fluid 156 and a set of apertures 158-1, . . . , 158-N. Each aperture 158-X extends from the chamber 154 to a periphery of an optical interface 160-X of a corresponding connector housing 24-X to clean that optical interface 160-X. In one arrangement, a sub-micron filter 162-X resides in each aperture 158-X to remove contaminants from the compressed fluid as it passes through the aperture 158-X.

The connector assembly 150 is convenient for circuit boards (see the circuit board 56 of FIG. 1B) which form multiple optical connections with other fiber optic components. For example, when the connector assembly 150 mounts to the circuit board, that circuit board is capable of forming optical connections with N other fiber optic components (N being a positive integer), e.g., N circuit boards, N fiber optic cable assemblies, etc.

In one arrangement, the connector assembly 150 mounts to a backplane (e.g., see the circuit board 56 in FIG. 1A). The chamber 154 operates as a fluid reservoir that provides pressurized fluid. The optical connector housings 24 are essentially individual optical connectors which connect to other optical connectors of one or more other circuit boards to form optical connections when the one or more other circuit boards connect to the backplane.

It should be understood that the connector assembly 150 is a suitable replacement for multiple optical connectors 22 of FIG. 1A. When a connector 22 (see FIG. 1A) connects with one of the connector housings 24-X, the piston 32 of the optical connector 22 can actuate a trigger mechanism (e.g., push on a trigger) associated with the connector housing 24-X to release of some of the compressed fluid in the chamber 154 through the aperture 158-X. The aperture 158-X directs the fluid over the optical interface 160-X of the connector housing 24-X to clean that optical interface 160-X. Accordingly, this arrangement preferably does not include the piston 32 of FIG. 1A but just the trigger mechanism.

It should be further understood that the configuration of the optical connector housings 24 relative to the compressed fluid source 152 (i.e., a reservoir of compressed fluid) can have topologies other than that shown in FIG. 6. For example, in other arrangements, the housings 24 are arranged in a column, and the apertures 158 are defined by the housings 24. Channels, which are formed by or within a circuit board (e.g., a backplane), connect the apertures 162 to the compressed fluid source 152 (e.g., that run underneath some of the connector housings 24 and through the circuit board). Other topologies are suitable as well.

Figure 7A:
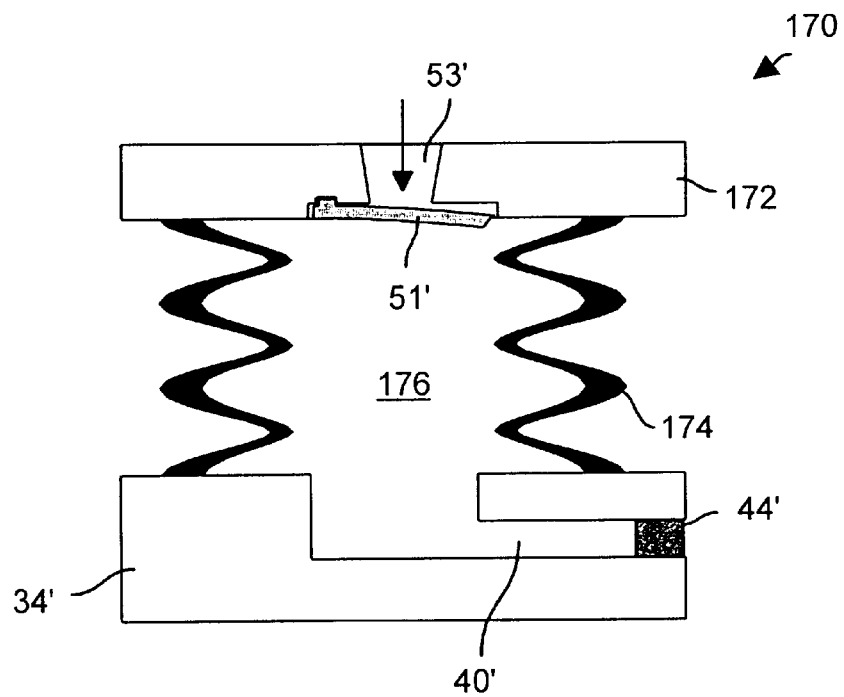
FIG. 7A is a cross-sectional side view of an alternative chamber configuration which is suitable for use by the optical connection system of FIG. 1A.

FIG. 7A shows a cross-sectional side view 170 of an alternative configuration (e.g., a bellows configuration) for a portion of the optical connector 24 of FIG. 1A. In this alternative configuration, the optical connector housing 34 defines an aperture 40' which holds a filter 44' (e.g., a sub-micron filter). Additionally, the optical connector 24 includes an actuation member 172 and a compressible member 174 (e.g., flexible rubber or plastic) which form an enclosure mechanism that defines a cavity 176. The actuation member 172 includes a check valve 51' which controls opening and closing of a fluid path 53' which leads to a fluid source (e.g., external air). As shown, fluid (e.g., air) can enter the cavity 176 through the fluid path 53' when the relative pressure within the cavity 176 is zero or negative (see arrow).

When the actuation member 172 is moved toward the optical connector housing 34' (e.g., when the actuation member 172 is pushed toward the optical connector housing 34' by the optical connector 22 of FIG. 1A), the check valve 51' closes (due to relative positive pressure within the cavity 176) thus preventing fluid within the cavity 176 from escaping through the fluid pathway 53'. Rather, the fluid within the cavity 176 compresses and escapes through the aperture 40' and the filter 44' to clean one or more optical interfaces (see the optical interfaces 28, 36 of FIG. 1A).

Figure 7B:
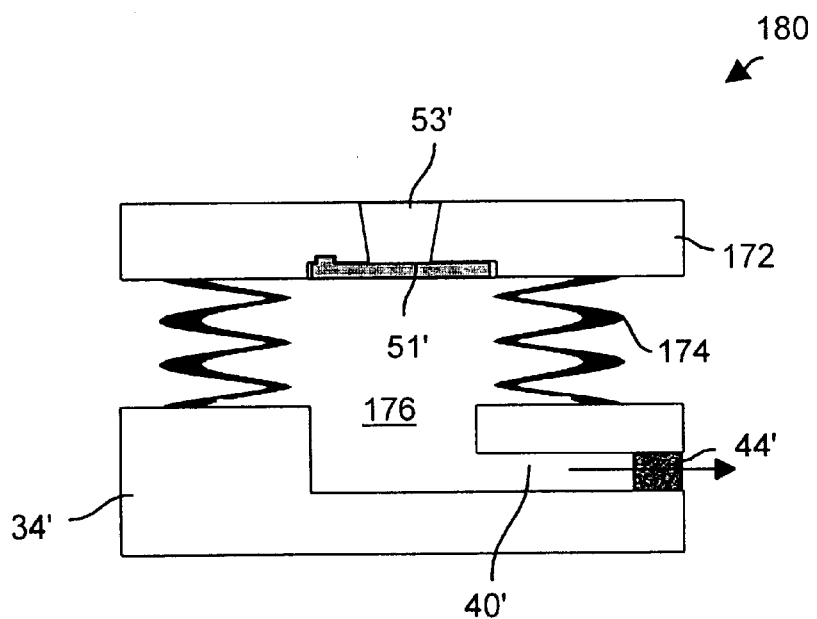
FIG. 7B is a cross-sectional side view of the alternative chamber configuration of FIG. 7A when the chamber is in a compressed state.

FIG. 7B shows a cross-sectional side view 180 of the alternative configuration for the portion of the optical connector 24 of FIG. 7A when the actuation member 172 is pushed toward the optical connector housing 34'. As shown, the volume of the cavity 176 is reduced, and fluid within the cavity 176 escapes through the aperture 40' and the filter 44' (see arrow).

During un-mating of the connector 24 from another connector (e.g., the connector 22 of FIG. 1A), force against the actuation member 172 is removed and fluid enters the cavity 176 through the fluid path 53' and through the check valve 51'. Accordingly, dirt and dust are not drawn toward the filter 44' and the aperture 40', and over the optical interfaces.

As described-above, the invention is directed to techniques for pneumatically cleaning optical interfaces (e.g., the interfaces 28, 36, 132, 160) of fiber optic components (e.g., the fiber optic cable assembly 54, the circuit boards 62, 66, etc.). Preferably, fluid is delivered in an automated manner at a particular time (e.g., during connection of two fiber optic components) in order to alleviate the burden of a technician having to manually clean the optical interfaces using conventional approaches such as wiping the optical interface with cleaning material or applying a stick-on adhesive each time the technician exposes the optical interface. Any contaminating dust and dirt can be blown away in a controlled manner thus providing clean optical interfaces for forming fiber optic connections (see set of optical connections 102 in FIG. 2D). The features of the invention, as described above, may be employed in computer systems and computer-related components such as those of Teradyne, Incorporated of Boston, Mass.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the optical interfaces 28, 36 were shown as 5×5 arrays of fiber optic ends by way of example only. Other configurations are suitable for use as the optical interfaces 28, 36 as well (e.g., a single fiber optic end, 2×2 arrays, 1×12 arrays, 2×12 arrays, etc.).

Additionally, it should be understood that the fluid used to clean the optical interfaces was described as air or nitrogen by way of example only. Other fluids are suitable for use by the invention as well. For example, the fluid may include a combination of nitrogen and a solvent or cleaning solution (e.g., oil-based, water-based, etc.) for enhanced cleaning of the optical interfaces. The optical connector 130 of FIG. 5 which uses a container 140 is well-suited for such mixtures. In such application, it may be preferable not to include filters in the apertures 40 of the corresponding optical connectors 24.

Furthermore, it should be understood that the above-described arrangements can be used to clean only one of the two optical interfaces forming the set of optical connections. For example, with reference to FIG. 1A, suppose that the optical connector 24 resides on a backplane recessed within a card cage, and that the optical connector 22 resides on a daughter card (i.e., a circuit board) which slides into the card cage and connects with the backplane. The optical connector 22 may be easily accessible by a user, but the optical connector 24 may be difficult to access by the user. Accordingly, the user can manually clean the optical interface 28 of the optical connector 22 in a conventional manner, but indirectly and automatically clean the optical interface 36 of the optical connector 24 by simply connecting the two optical connectors 22, 24 together.

Additionally, it should be understood that the piston 32 of the optical connector 22 was shown in FIG. 1A as a cylinder by way of example only. Other shapes are suitable for the piston 32 as well such as a rectangular shape, a square shape, a hexagonal shape, etc.

Furthermore, it should be understood that the check valve 51 of FIG. 1A was shown as being part of the optical connector 22 by way of example only. In other arrangements, the check valve 51 is part of the optical connector 24 (e.g., built into the optical connector housing 34).

Similarly, it should be understood that the check valve 51' of FIGS. 7A and 7B was shown as being part of the actuation member 172 by way of example only. In other arrangements, the check valve 51' is in other locations (e.g., part of the optical connector housing 34', part of the other connector 22, etc.).

Furthermore, it should be understood that the fluid was described, by way of example only, as originating from a fluid source (e.g., a precharged container 140 of FIG. 5, etc.) or simply being air. Other fluid sources are suitable for use by the invention such as pumps (e.g., electrical pumps, hand pumps, etc.). In one arrangement, two optical connectors connect when a circuit board having one of the optical connectors slides into a card cage and engages a backplane having the other optical connector. As the circuit board slides into the card cage, the circuit board actuates a pumping mechanism (e.g., an arm that compresses fluid in a bicycle pump-like manner) to charge the fluid source (i.e., the fluid reservoir). This arrangement enables a large volume of fluid (e.g., air) to be displaced for more effective cleaning action. In other arrangements, a refillable canister of pressurized fluid is simply attached (e.g., screwed onto the backplane) to provide a pressurized fluid reservoir. Such alternatives are intended to be part of the invention.

What is claimed is:

1. An optical connection system, comprising:
   a first optical connector having a first optical connector housing and a first optical interface fastened to the first optical connector housing; and
   a second optical connector having a second optical connector housing and a second optical interface fastened to the second optical connector housing, wherein the second optical connector housing defines an aperture that directs fluid over at least one of the first and second optical interfaces.

2. The optical connection system of claim 1 wherein the second optical connector housing further defines a chamber, and wherein the first optical connector housing defines a piston that engages the chamber defined by the second optical connector housing to force fluid within the chamber through the aperture defined by the second optical connector housing.

3. The optical connection system of claim 2 wherein the second optical connector further includes an elastomer seal disposed around an opening of the chamber through which the piston passes when engaging the chamber.

4. The optical connection system of claim 1, further comprising:
   a container that stores compressed fluid, the container including a trigger that actuates to release the compressed fluid through the aperture defined by the second optical connector housing.

5. The optical connection system of claim 4 wherein the compressed fluid is substantially nitrogen.

6. The optical connection system of claim 4 wherein the first optical connector housing defines a cavity configured to hold at least a portion of the container.

7. The optical connection system of claim 1, further comprising:
   a filter that traps impurities, the filter being disposed within the aperture defined by the second optical connector housing of the second optical connector.

8. The optical connection system of claim 1 wherein the second optical connector includes an enclosure mechanism that defines a cavity with the second optical connector housing, and wherein the first optical connector is capable of compressing the enclosure mechanism to direct fluid within the cavity through the aperture and over at least one of the first and second optical interfaces.

9. The optical connection system of claim 1 wherein at least one of the first and second optical connector housings includes a check valve which opens to prevent fluid from being drawn back through the aperture and over the first and second optical interfaces when the first and second optical connectors are separated.

10. The optical connection system of claim 1 wherein the second optical connector is configured to direct the fluid over at least one of the first and second optical interfaces while the first and second optical interfaces move toward each other to form a set of fiber optic connections.

11. A method for cleaning an optical interface, comprising the steps of:
    providing a first optical connector and a second optical connector;
    moving a first optical interface of the first optical connector and a second optical interface of the second optical connector toward each other; and
    directing fluid (i) through an aperture of an optical connector housing of the second optical connector and (ii) over at least one of the first optical interface of the first optical connector and the second optical interface of the second optical connector.

12. The method of claim 11 wherein the optical connector housing of the second optical connector further defines a chamber, wherein the first optical connector includes an optical connector housing that defines a piston, and wherein the step of directing fluid includes the step of:
    engaging the piston within the chamber defined by the optical connector housing of the second optical connector to direct fluid within the chamber through the aperture defined by the optical connector housing of the second optical connector.

13. The method of claim 12 wherein the second optical connector further includes an elastomer seal disposed around an opening of the chamber, and wherein the step of engaging includes the step of:

moving an end of the piston through the opening of the chamber such that the side of the piston contacts the elastomer seal as the piston passes through the opening and into the chamber.

14. The method of claim 11 wherein the step of directing fluid includes the step of:

actuating a trigger of a container that stores compressed fluid to release the compressed fluid through the aperture defined by the optical connector housing of the second optical connector.

15. The method of claim 14 wherein the first optical connector includes an optical connector housing that defines a cavity configured to hold the container, and wherein the step of providing the first optical connector and the second optical connector includes the step of:

inserting at least a portion of the container into the cavity defined by the optical connector housing of the first optical connector such that the optical connector housing of the first optical connector holds the container.

16. The method of claim 11 wherein the step of providing the first optical connector and the second optical connector includes the step of:

installing a filter within the aperture defined by the optical connector housing of the second optical connector, the filter being configured to trap impurities.

17. The method of claim 11 wherein the step of moving occurs substantially concurrently with the step of directing.

18. A first optical connector for connecting to a second optical connector, the first optical connector comprising:

a first optical interface; and a first optical connector housing fastened to the first optical interface, wherein the first optical connector housing defines a piston that engages a chamber defined by a second optical connector housing of the second optical connector to force fluid within the chamber through an aperture defined by the second optical connector housing and over at least one of the first optical interface and a second optical interface of the second optical connector.

19. A first optical connector for connecting to a second optical connector, the first optical connector comprising:

a first optical interface;

a first optical connector housing fastened to the first optical interface; and a container that stores compressed fluid and that attaches to the first optical connector housing through the opening defined by the second optical connector housing, the container including a trigger that actuates to release the compressed fluid through an aperture defined by a second optical connector housing of the second optical connector and over at least one of the first optical interface and a second optical interface of the second optical connector.

20. The first optical connector of claim 19 wherein the compressed fluid is substantially nitrogen.

21. The optical connection system of claim 19 wherein the first optical connector housing defines a cavity configured to hold at least a portion of the container.

22. A first optical connector for connecting to a second optical connector, the first optical connector comprising:

a first optical interface; and a first optical connector housing fastened to the first optical interface, wherein the first optical connector housing defines an aperture that directs fluid over at least one of the first optical interface and a second optical interface of the second optical connector.

23. The first optical connector of claim 22 wherein the first optical connector housing defines a chamber that engages a piston defined by a second optical connector housing of the second optical connector to force fluid within the chamber through the aperture defined by the first optical connector housing.

24. The first optical connector of claim 23, further comprising:

an elastomer seal disposed around an opening of the chamber through which the piston passes when engaging the chamber.

25. The first optical connector of claim 22, further comprising:

a filter that traps impurities, the filter being disposed within the aperture defined by the first optical connector housing.

26. The first optical connector of claim 22 wherein the first optical connector is configured to direct the fluid over at least one of the first and second optical interfaces while the first and second optical interfaces move toward each other to form a set of fiber optic connections.

27. A first optical connector for connecting to a second optical connector, the first optical connector comprising:

a fluid reservoir that provides pressurized fluid;

a backplane coupled to the fluid reservoir;

an optical interface; and an optical connector housing, coupled to the fluid reservoir and the backplane, that fastens to the optical interface in order to hold the optical interface in place, wherein the optical connector housing defines an aperture that directs fluid from the fluid reservoir over at least one of the optical interface held by the optical connector housing and an optical interface of the second optical connector.

* * * * *